United States Patent
Fahland et al.

(10) Patent No.: US 10,315,710 B2
(45) Date of Patent: Jun. 11, 2019

(54) SELF-CALIBRATING LOAD SENSOR SYSTEMS AND CONTROL LOGIC FOR ACTIVE AERODYNAMIC DEVICES OF MOTOR VEHICLES

(71) Applicant: GM GLOBAL TECHNOLOGY OPERATIONS LLC, Detroit, MI (US)

(72) Inventors: Jason D. Fahland, Fenton, MI (US); Joshua R. Auden, Brighton, MI (US); Olamide Akintewe, Waterford, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 78 days.

(21) Appl. No.: 15/685,664

(22) Filed: Aug. 24, 2017

(65) Prior Publication Data

US 2019/0061837 A1   Feb. 28, 2019

(51) Int. Cl.
   B62D 35/00   (2006.01)

(52) U.S. Cl.
   CPC ........ *B62D 35/00* (2013.01); *B60Y 2400/305* (2013.01)

(58) Field of Classification Search
   CPC ................... B62D 35/00; B60Y 2400/305
   See application file for complete search history.

(56) References Cited

U.S. PATENT DOCUMENTS

| | | |
|---|---|---|
| 4,810,022 A * | 3/1989 | Takagi ................. B62D 35/005 296/180.5 |
| 4,867,397 A | 9/1989 | Pamadi et al. |
| 5,280,990 A | 1/1994 | Rinard |
| 5,360,252 A | 11/1994 | Larsen |
| 5,908,217 A | 6/1999 | Englar |
| 6,283,407 B1 | 9/2001 | Hakenesch |
| 7,192,077 B1 | 3/2007 | Hilleman |
| 7,255,387 B2 | 8/2007 | Wood |
| 7,431,381 B2 | 10/2008 | Wood |
| 8,196,994 B2 | 6/2012 | Chen |
| 9,132,904 B2 | 9/2015 | Durham |
| 9,267,491 B2 * | 2/2016 | Vossler ................. F03D 7/0252 |

(Continued)

FOREIGN PATENT DOCUMENTS

DE          19932167 A1 *  1/2001  ............ B62D 37/02

*Primary Examiner* — Rodney A Butler
(74) *Attorney, Agent, or Firm* — Quinn IP Law

(57) ABSTRACT

Disclosed are self-calibrating load sensor systems for active aerodynamics devices, methods for making or using such load sensor systems, and motor vehicles equipped with a self-calibrating load sensor system to govern operation of the vehicle's active aero device(s). An active aero sensing system includes a load sensor that mounts to the vehicle body, and detects downforces on the vehicle. A memory device stores mapped vehicle downforce data calibrated to the motor vehicle. A vehicle controller receives downforce signals generated by the load sensor, and calculates an average downforce value from these signals. The controller determines if the average downforce differs from a calibrated downforce value retrieved from the memory device. If so, the controller responsively applies an offset value to subsequent downforce signals received from the load sensor, and dynamically controls operation of the active aero device based, at least in part, on these signals modified by the offset value.

20 Claims, 2 Drawing Sheets

(56) References Cited

U.S. PATENT DOCUMENTS

| | | |
|---|---|---|
| 9,333,994 B1 | 5/2016 | Fahland et al. |
| 2009/0026797 A1 | 1/2009 | Wood |
| 2010/0181799 A1 | 7/2010 | Ryan et al. |
| 2011/0068604 A1 | 3/2011 | Neuberger et al. |
| 2011/0095564 A1 | 4/2011 | Chen |
| 2011/0095566 A1 | 4/2011 | Chen |
| 2011/0148140 A1 | 6/2011 | Benton |
| 2011/0175395 A1 | 7/2011 | Guigne et al. |
| 2013/0062908 A1 | 3/2013 | Henderson et al. |
| 2014/0309819 A1* | 10/2014 | Catt ................. B64C 19/00 701/3 |
| 2014/0336871 A1* | 11/2014 | Catt ................. B60T 10/00 701/33.4 |
| 2017/0088200 A1 | 3/2017 | Heil et al. |
| 2017/0088201 A1 | 3/2017 | Heil et al. |
| 2017/0151984 A1 | 6/2017 | Bray et al. |
| 2017/0158257 A1 | 6/2017 | Fahland et al. |
| 2017/0158259 A1 | 6/2017 | Fahland et al. |

* cited by examiner

SELF-CALIBRATING LOAD SENSOR SYSTEMS AND CONTROL LOGIC FOR ACTIVE AERODYNAMIC DEVICES OF MOTOR VEHICLES

INTRODUCTION

The present disclosure relates generally to features for improving the aerodynamic performance of motor vehicles. More specifically, aspects of this disclosure relate to load sensor devices, systems and methods for controlling active aerodynamic devices to dynamically modify the aerodynamic characteristics of motor vehicles.

Many current production motor vehicles, such as the modern-day automobile, are originally equipped with or retrofit to employ stock body hardware and aftermarket accessories engineered to improve the aerodynamic performance of the vehicle. Front air dams and splitters, for example, modify the flow of air passing under the vehicle body to balance the distribution of fore and aft downforce. As the name implies, an air dam is a fluid barrier structure; in this case, one that is mounted underneath or integrated with the front-end bumper structure of the vehicle body, extending downward into proximity with the roadway. Air dams—or more colloquially "front spoilers"—enhance vehicle stability and aerodynamics by blocking and redirecting turbulent air flowing under the chassis. Splitters, on the other hand, are constructed as a flat extension to the very bottom of the front bumper, extending forward from the vehicle and parallel to the ground. A splitter acts like a wedge that forces high pressure air upwards and over the vehicle, and forces high speed, low pressure air underneath the car, resulting in a net positive downforce.

While splitters and air dams are designed to modify the aerodynamic characteristics of the front end of a vehicle, spoilers and diffusers operate to modify aerodynamic flow at the rear end of a vehicle. An air spoiler, which is normally anchored on top of the trunk lid or rear roof rail, is shaped similar in geometry to an inverted airfoil to modify airflow and generate an aerodynamic pressure gradient that produces downforce on the rear tires. A rear diffuser, on the other hand, is a series of specially formed channels on the aft part of the vehicle underbody that improves aerodynamic properties by ameliorating the transition between high-velocity airflow along the undercarriage and the much slower freestream airflow of surrounding ambient air. Generally speaking, a rear diffuser helps underbody airflow to decelerate and expand by providing pressure recovery so that it does not cause excessive flow separation and drag.

For some high-performance automotive applications, the vehicle is stock equipped with an active aerodynamic element operable to be reoriented or repositioned while the automobile is in motion to adjust the aerodynamic properties of the vehicle. One such "active aero" device is the deployable rear spoiler that is designed to be dynamically retracted and extended based on vehicle operating conditions. At lower vehicle speeds, for instance, the spoiler is retracted to a stowed position, seated generally flush against the rear of the vehicle, to reduce fluid drag forces. When the vehicle reaches higher speeds—around 50 to 60 mph—the spoiler is automatically deployed to an extended position, displaced away or projecting angularly from the rear of the vehicle, to reduce the effects of turbulent air flow and to generate downforce for improved vehicle stability and handling. Another available active aero device is the rotatable rear wing which has a dynamically adjustable pitch angle to control drag and downforce at various speeds and, for some architectures, provide air-braking capabilities.

SUMMARY

Disclosed herein are self-calibrating load sensor systems and related control logic for active aerodynamics devices of motor vehicles, methods for making and methods for using such load sensor systems, and motor vehicles equipped with a self-calibrating load sensor system that helps to govern operation of the vehicle's active aero device(s). By way of example, there is presented a novel self-calibrating downforce sensor architecture and closed-loop control scheme that utilizes calibrated vehicle data to determine if a downforce load sensor has drifted. Mapped vehicle data from designated driving scenarios in which downforce on the vehicle is accurately modeled, as well as mapped vehicle data from designated idle conditions is used to determine if one or more load sensors for measuring downforce have drifted. The closed-loop system automatically responds to detected sensor drift by applying an offset to correct the error for future downforce sensor signals. This sensor system also monitors environmental factors that disrupt airflow across the vehicle, such as severe crosswinds and proximal vehicle traffic, and implements calibrated offset values to compensate for these factors when correcting sensor reading errors. Self-calibration may also flag extreme sensor errors requiring maintenance or replacement.

Attendant benefits for at least some of the disclosed concepts include self-calibrating load sensor systems providing improved control of active aerodynamic devices by a governing vehicle controller that uses closed-loop learning to rectify sensor signal errors which, in turn, optimizes the fidelity of estimated downforce. Disclosed active aero sensor architectures also help to eliminate or otherwise reduce costs associated with implementing extensive sensor calibration strategies during vehicle production while retaining the performance and reliability advantages of directly measuring downforce. Other attendant benefits include enabling a self-learning load-sensing strategy that eliminates the need to regularly or intermittently recalibrate onboard vehicle sensors, e.g., via a dealer, owner, or original equipment manufacturer (OEM). Disclosed active aero sensor systems also help to improve vehicle awareness through increased accuracy of downforce estimates. Improving sensor accuracy of downforce detection on the vehicle helps to improve the accuracy of commanded downforce implemented by the active aero device, thereby further optimizing vehicle aerodynamic performance which helps to improve vehicle stability, reduce wind-borne noise, and minimize drag.

Aspects of the present disclosure are directed to self-calibrating downforce sensor architectures and related control logic for governing operation of active aero devices. Disclosed, for example, is a sensor system for controlling an active aerodynamics device of a motor vehicle. This active aero sensor system includes a load cell, fluidic transducer, or other applicable sensor device that mounts to the vehicle body, detects downforces on the motor vehicle, and generates electronic signals indicative of the detected downforces. A memory device, which may be resident to or remote from the vehicle body, stores mapped vehicle downforce data calibrated to the motor vehicle. The sensor system also includes a vehicle controller that is communicatively connected to the load sensor, memory device, and active aero device. This vehicle controller is programmed to receive downforce signals from the load sensor, and calculate an average downforce value from these received signals. The controller then determines if the calculated average downforce value differs from a calibrated downforce value retrieved from the mapped vehicle downforce data stored in the memory device. If a positive determination is made, the controller responsively applies an offset value to subsequent downforce signals received from the load sensor, and dynamically controls operation of the active aero device based, at least in part, on these downforce signals as modified by the offset value.

Other aspects of the present disclosure are directed to motor vehicles equipped with self-calibrating active aero sensor architectures. As used herein, the term "motor vehicle" may include any relevant vehicle platform, such as passenger vehicles (combustion engine, hybrid electric, full electric, fuel cell, fuel cell hybrid, fully or partially autonomous, etc.), commercial vehicles, industrial vehicles, tracked vehicles, off-road and all-terrain vehicles (ATV), farm equipment, boats, airplanes, etc. A motor vehicle is presented that includes a vehicle body with a passenger compartment, multiple road wheels, and one or more active aerodynamics devices each mounted proximate a front end or a rear end of the vehicle body (e.g., to a trunk lid, engine hood, tailgate, liftgate, front or rear bumper assembly, etc.).

Continuing with the above example, the motor vehicle is equipped with one or more load sensors mounted at discrete locations on the vehicle body. Each load sensor is operable to detect downforces on the motor vehicle, and generate electronic signals indicative thereof. A memory device, which may generally be in the nature of non-transitory, computer-readable media, stores mapped vehicle downforce data calibrated, e.g., to the make and model of the vehicle. A vehicle controller, such as a programmable onboard electronic control unit, communicates with the load sensor, memory device, and active aerodynamics device. The vehicle controller is programmed to receive downforce signals from the load sensor(s), and calculate an average downforce value from received downforce signals for each sensor. The controller then determines if a calculated average downforce value differs from a calibrated downforce value, e.g., by more than a hard-coded threshold drift error percentage, retrieved from the mapped vehicle downforce data. If a calculated average downforce value does differ, e.g., by more than the maximum tolerance, the controller automatically applies an offset value to subsequent downforce signals received from that load sensor. Operation of the active aero device is thereafter dynamically controlled based, in whole or in part, on subsequently received downforce signals, including those modified by the offset value.

Additional aspects of the present disclosure are directed to methods for making and methods for using self-calibrating, closed loop active aero sensor arrangements. Disclosed, for example, is a method of calibrating a sensor system for controlling an active aerodynamics device of a motor vehicle. The representative method includes, in any order and in any combination with any of the disclosed features and options: detecting, via a load sensor mounted to the vehicle body, a downforce on the motor vehicle; receiving, from the load sensor via a vehicle controller communicatively connected thereto, downforce signals indicative of the detected downforce; calculating, via the vehicle controller, an average downforce value from the received downforce signals; retrieving, from a memory device via the vehicle controller communicatively connected thereto, a calibrated downforce value stored in mapped vehicle downforce data calibrated to the motor vehicle; determining, via the vehicle controller, if the calculated average downforce value differs from the calibrated downforce value; responsive to a determination that the calculated average downforce value differs from the calibrated downforce value, applying an offset value to subsequent downforce signals received from the load sensor; and, dynamically controlling operation of the active aerodynamics device based, at least in part, on the subsequent downforce signals modified by the offset value.

The above summary is not intended to represent every embodiment or every aspect of the present disclosure. Rather, the foregoing summary merely provides an exemplification of some of the novel concepts and features set forth herein. The above features and advantages, and other features and advantages of the present disclosure, will be readily apparent from the following detailed description of illustrative embodiments and representative modes for carrying out the present disclosure when taken in connection with the accompanying drawings and the appended claims. Moreover, this disclosure expressly includes any and all combinations and subcombinations of the elements and features presented above and below.

Figure 1:
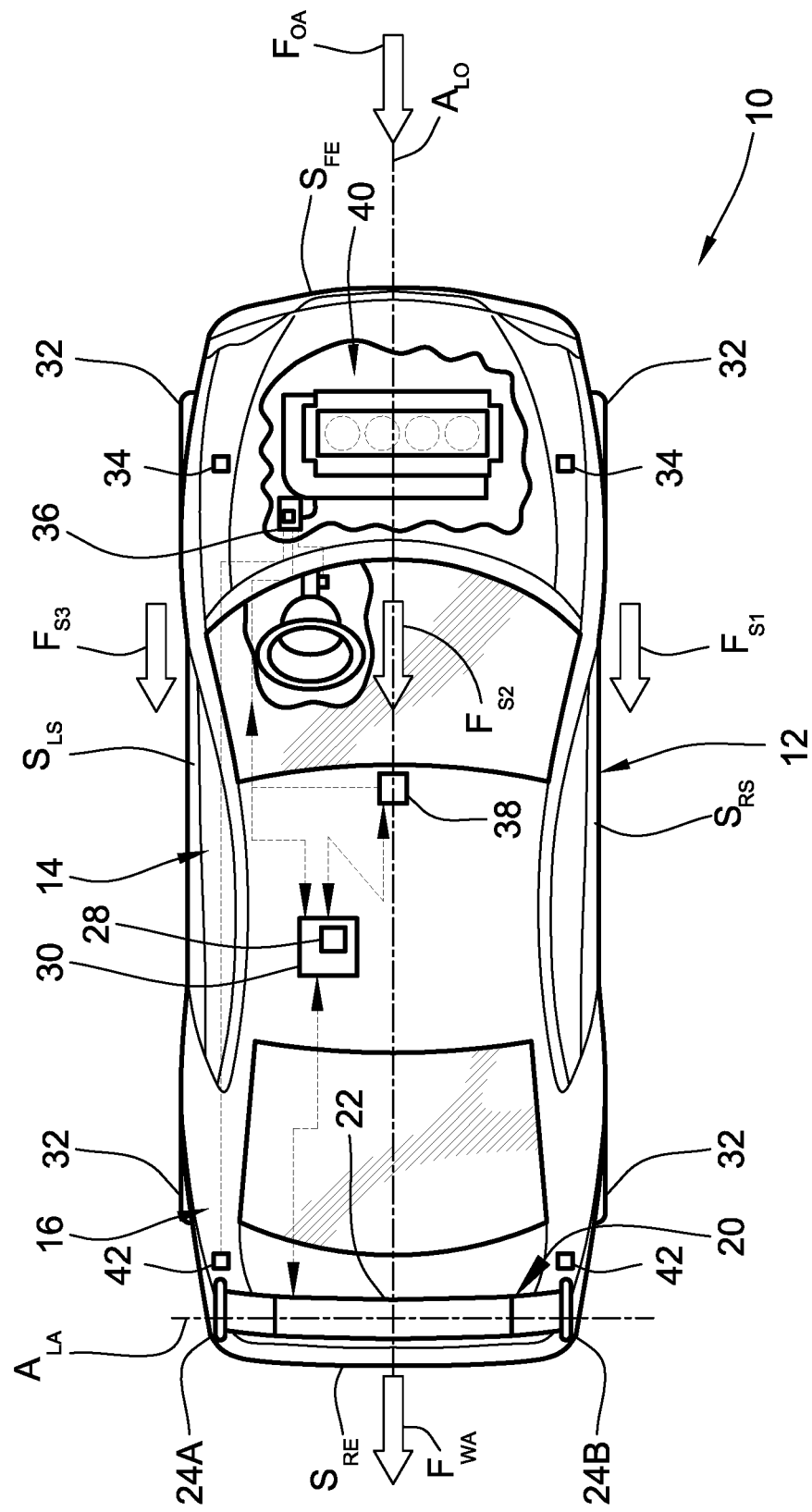
FIG. 1 is a partially schematic plan-view illustration of a representative motor vehicle equipped with an example of an active aerodynamics device governed by a self-calibrating load sensor system in accordance with aspects of the present disclosure.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope of this disclosure as defined by the appended claims.

DETAILED DESCRIPTION

This disclosure is susceptible of embodiment in many different forms. There are shown in the drawings and will herein be described in detail representative embodiments of the disclosure with the understanding that these illustrated examples are provided as an exemplification of the disclosed principles, not limitations of the broad aspects of the disclosure. To that extent, elements and limitations that are described, for example, in the Abstract, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, etc., are with respect to a motor vehicle, such as a forward driving direction of a motor vehicle when the vehicle is operatively oriented on a normal driving surface, for example.

Referring now to the drawings, wherein like reference numbers refer to like features throughout the several views, there is shown in FIG. 1 a partially schematic illustration of a representative automobile, which is designated generally at 10 and portrayed herein for purposes of discussion as a two-seat coupe-style passenger vehicle. Mounted to the body 12 of the automobile 10, e.g., aft of a passenger compartment 14 and above a rear cargo compartment 16 (also referred to herein as "trunk"), is an actively controlled ("active") aerodynamics device 20 for improving aerodynamic performance of the vehicle 10. The illustrated automobile 10—also referred to herein as "motor vehicle" or "vehicle" for short—is merely an exemplary application with which novel aspects and features of this disclosure may be practiced. In the same vein, implementation of the present concepts into a rear pedestal-type spoiler assembly should also be appreciated as a representative application of the novel features disclosed herein. As such, it will be understood that aspects and features of this disclosure may be applied to other active aero device configurations, and may be implemented for any logically relevant type of motor vehicle. Lastly, the drawings presented herein are not necessarily to scale and are provided purely for instructional purposes. Thus, the specific and relative dimensions shown in the drawings are not to be construed as limiting.

As shown in FIG. 1, the vehicle body 12 defines four body sides: a body front side or front end $S_{FE}$, a body rear side or rear end $S_{RE}$ opposite the front end $S_{FE}$, a lateral port side or left side $S_{LS}$, and a lateral starboard side or right side $S_{RS}$ opposite the left side $S_{LS}$. The left (port) side $S_{LS}$ and right (starboard) side $S_{RS}$ are generally parallel to one another and with respect to a longitudinal axis $A_{LO}$ of the vehicle 10, and span the distance between the vehicle's front and rear ends $S_{FE}$, $S_{RE}$. During normal vehicle operation, the front end $S_{FE}$ is oriented to face oncoming ambient airflow $F_{OA}$ when the vehicle 10 is in forward motion relative to the road surface. As the vehicle 10 moves across the road surface, the ambient airflow $F_{OA}$ passes around the vehicle body 12 and splits into various airflow portions, represented in FIG. 1 with first airflow portion $F_{S1}$ passing around the starboard side $S_{RS}$ of the vehicle 10, second airflow portion $F_{S2}$ passing around the vehicle's port side $S_{LS}$, and third airflow portion $F_{S3}$ passing over the top of the vehicle 10. A fourth airflow portion (not visible in the view provided) passes underneath the vehicle 10 along the undercarriage thereof. These airflow segments $F_{S1}$, $F_{S2}$ and $F_{S3}$ eventually rejoin in a wake area or recirculating airflow region $F_{WA}$ immediately behind the vehicle's rear end $S_{RE}$.

Automobile 10 is retrofit or stock equipped with one or more active aero devices, an example of which is shown in FIG. 1 as an active spoiler assembly 20 with a selectively variable width. The selective expansion and contraction of the active spoiler assembly 20 relative to a transverse vehicle axis $A_{LA}$ is automated via a vehicle controller 30, which may be resident to or remote from the body 12 of the vehicle 10. This active spoiler assembly 20 includes a wing-shaped main body 22 terminating at opposing ends thereof with fin ends (or "fins") 24A and 24B that are movable relative to a laterally oriented spoiler axis $A_{LA}$. As used herein, the term "wing-shaped" may be defined as a structure having an airfoil shape that produces an aerodynamic force, such as lift or downforce, during propulsion through a fluid. The spoiler's main body 22 and fins 24A, 24B cooperatively regulate the movement of ambient airflow along the longitudinal axis $A_{LO}$ of the vehicle body 12 aft of the passenger compartment 14. In FIG. 1, the spoiler assembly 20 is a pedestal or "wing" type spoiler architecture, e.g., employing a stanchion assembly (not visible in the view provided) for mounting the spoiler's main body 22 to the vehicle's body 12. While shown equipped with a single active aero device, which is configured as a rear pedestal spoiler with movable fin ends, it is envisioned that the vehicle 10 may be equipped with additional or alternative active aero devices, which may be similar to or distinct from the representative example shown in the drawings.

The first fin 24A is mounted proximate a first longitudinal end of the spoiler's elongated main body 22, positioned proximate the port side $S_{LS}$ of the vehicle 10. Conversely, the second fin 24B is mounted proximate a second longitudinal end of the elongated main body 22, positioned proximate the vehicle's starboard side $S_{RS}$. With this configuration, the fins 24A, 24B may telescopingly slide along rectilinear paths between respective retracted and extended positions to thereby vary the effective transverse width of the spoiler assembly 20. For at least some applications, the fins' rectilinear paths are generally coaxial and both generally orthogonal to the vehicle's longitudinal axis $A_{LO}$. Optional designs may employ fin paths that are obliquely angled to one another. Moreover, the fins may follow arcuate and other non-linear paths. Capping the distal end of each fin 24A, 24B is a polyhedral plate that is generally perpendicular to the road surface, aligned on a respective fin axis that is generally parallel to the vehicle's longitudinal axis $A_{LO}$. Accordingly, the spoiler fins 24A, 24B also help to control movement of ambient airflow perpendicular to the longitudinal axis $A_{LO}$ of the body 12. The wing-shaped body 22 and fins 24A, 24B may be formed from a suitably rigid but low mass material, such as an engineered plastic, fiber-reinforced glass composite, or aluminum, e.g., for structural stability and resiliency.

As indicated above, electronic vehicle controller 30 is constructed and programmed to govern the expansion and contraction of the spoiler assembly 20 to selectively modify the aerodynamic characteristics of the motor vehicle 10. Control module, module, controller, control unit, electronic control unit, processor, and any permutations thereof may be defined to mean any one or various combinations of one or more of logic circuits, Application Specific Integrated Circuit(s) (ASIC), electronic circuit(s), central processing unit(s) (e.g., microprocessor(s)), and associated memory and storage (e.g., read only, programmable read only, random access, hard drive, tangible, etc.)), whether resident, remote or a combination of both, executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms may be defined to mean any controller executable instruction sets including calibrations and look-up tables. The ECU may be designed with a set of control routines executed to provide the desired functions. Control routines are executed, such as by a central processing unit, and are operable to monitor inputs from sensing devices and other networked control modules, and execute control and diagnostic routines to control operation of devices and actuators. Routines may be executed at in real-time, continuously, systematically, sporadically and/or at regular intervals, for example, each 100 microseconds, 3.125, 6.25, 12.5, 25 and 100 milliseconds, etc., during ongoing vehicle use or operation. Alternatively, routines may be executed in response to occurrence of an event.

With continuing reference to FIG. 1, the vehicle 10 employs one or more prime movers, such as an internal combustion engine (ICE) assembly 40, to transmit tractive power, e.g., through a multi-speed power transmission and drivetrain, to multiple road wheels 32. An array of wheel sensors 34 may be arranged at various locations throughout the vehicle body 12 to detect respective rotating speeds for each of the road wheels 32, and communicate signals indicative thereof to the vehicle controller 30. Once received, the vehicle controller 30 may be programmed to process, analyze and store (e.g., in resident memory device 28) sensor data, including correlating wheel speed data of sensor(s) 34 to road speed of the vehicle 10. The vehicle 10 is also equipped with one or more vehicle dynamics sensors 36, each of which may be in the nature of a single-axis or a triple-axis accelerometer, an angular rate sensor, an inclinometer, etc., for detecting yaw, pitch, roll, forward acceleration/deceleration, lateral acceleration/deceleration or any other dynamics related information of the vehicle 10 relative to the road surface, and communicate signals indicative thereof to the controller 30. In FIG. 1, the dashed arrows interconnecting the various illustrated components are emblematic of electronic signals or other communication exchanges by which data and/or control commands are transmitted, wired or wirelessly, from one component to the other. In addition, while shown as a constituent part of the vehicle controller 30 (e.g., embodied as main or auxiliary memory), memory device 28 of FIG. 1 may be a discrete integrated circuit (IC) device that is separately mounted to vehicle body 12, or may be remote from the vehicle 10 and accessible, e.g., via wireless communication with a distributed computer network.

It is envisioned that the vehicle 10 may utilize additional or alternative sensors, packaged at similar or alternative locations, to help execute any of the disclosed operations. For instance, the representative vehicle 10 of FIG. 1 is also equipped with one or more airflow sensors 38, e.g., designed to detect the velocity of the ambient airflow $F_{OA}$ relative to the vehicle 10, and communicate the detected airflow velocity to the vehicle controller 30. Airflow sensor(s) 38 may take on various designs, such as a pitot tube configured to detect the pressure of the ambient airflow $F_{OA}$ at a specific location relative to the vehicle body 12; the controller 30 may execute instructions to correlate the measured pressure to airflow velocity. In addition to the previously described sensing devices, the vehicle 10 is further equipped with one or more load sensors 42, each of which is designed to detect a downforce exerted by airflow traversing the vehicle 10, and transmit measured downforce signals to the controller 30. The load sensor(s) 42 may take on various forms, including a pneumatic or hydraulic load cell, inertial strain gauge, fluidic transducer, or other applicable sensor device. Optionally, one or more of the aforementioned sensors may be in the form of rotational position sensors, linear position sensors, ultrasonic sensors, laser sensors and piezoelectric-based sensors, etc.

Figure 2:
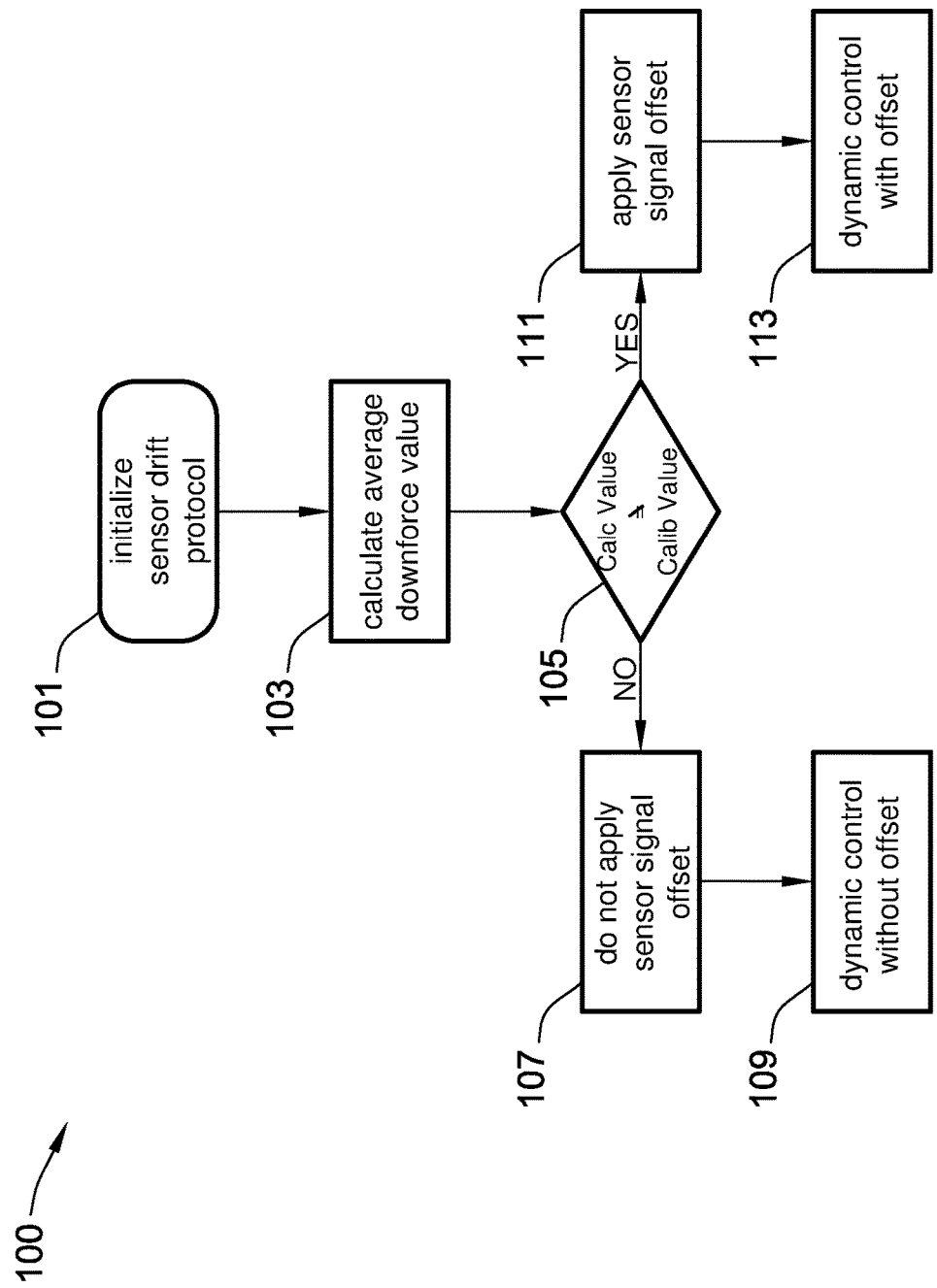
FIG. 2 is a flowchart of a representative algorithm or method for calibrating a vehicle load sensor system that may correspond to instructions executed by onboard control-logic circuitry, programmable electronic control unit, or other computer-based device of a motor vehicle in accord with aspects of the disclosed concepts.

With reference now to the flow chart of FIG. 2, an improved method or control strategy for calibrating a downforce detecting load sensor in a sensor system of a motor vehicle, such as load sensors 42 of automobile 10 in FIG. 1, is generally described at 100 in accordance with aspects of the present disclosure. Some or all of the operations illustrated in FIG. 2 and described in further detail below may be representative of an algorithm that corresponds to processor-executable instructions that may be stored, for example, in main or auxiliary or remote memory, and executed, for example, by an on-board or remote ECU, central processing unit (CPU), control logic circuit, or other module or device, to perform any or all of the above and/or below described functions associated with the disclosed concepts. It should also be recognized that the order of execution of the illustrated operation blocks may be changed, additional blocks may be added, and/or some of the blocks described may be modified, combined, or eliminated.

Method 100 begins at terminal block 101 with the vehicle 10 calling up an initialization protocol to determine whether or not any of the vehicle's load sensors 42 are drifting outside a tolerable range and, thus, necessitate recalibration. During normal system operation, sensor signal level should read at a set zero value, e.g., when the vehicle is not in motion or otherwise not subject to measurable aerodynamic downforces, or other calibrated datum value, e.g., when the vehicle is experiencing a measurable aerodynamic downforce under steady-state operating conditions. Over time, sensor signal level may vary from this set zero value or calibrated datum value. This will consequently introduce an error into subsequent force measurements equal to the amount of variation—or "drift"—as it is usually termed. Drift may result, for example, from significant changes in temperature, electronic stabilization, and/or aging of the sensor's electronic components. Field-use conditions have been shown to accelerate electronic sensor drift in vehicle applications, often exacerbating out-of-tolerance measurements. Vehicle load sensors are prone to sensor drift and consequent loss of accuracy; as such, regular calibration and adjustment is recommended. Terminal block 101 may, thus, be initiated continuously, systematically, arbitrarily, and/or responsively, e.g., upon detection of a measurable downforce by one of the in-vehicle load sensors. In this regard, the vehicle controller 30 may automatically receive downforce signals transmitted in real-time from a load sensor or may prompt the monitoring of aerodynamic forces and concomitant transmission of signals indicative thereof.

Upon initialization of the sensor calibration protocol, method 100 proceeds to process block 103 with processor-executable instructions for a vehicle controller to calculate an average downforce value from electronic downforce signals received from a vehicle load sensor. Prior to conducting the average downforce calculation, the vehicle controller may first determine if the motor vehicle is operating in any one of a number of calibrated steady-state conditions. Transient operating conditions, in which the vehicle is not operating in a designated "steady-state" condition, are susceptible to incidental factors that may skew the calculation, which could return an adverse false-positive. By way of non-limiting example, during a cornering operation, the vehicle's road wheels create centripetal forces to pull the vehicle around a turn, and the momentum of the vehicle actuates load transfer with a vertical component detectable as downward force via a load sensor. Consequently, the calculation conducted at process block 103 may be responsively initiated only after it is determined that the motor vehicle is operating in a calibrated steady-state condition. One example of a calibrated vehicle steady-state condition includes a designated quasi-static vehicle state in which the motor vehicle is stopped or otherwise generally idle on a generally flat road surface, and aerodynamic downforces are detectable via at least one vehicle load sensor without excessive signal noise. Another representative steady-state condition includes a designated dynamic vehicle state in which the vehicle is traversing a generally flat road surface at a substantially constant speed, and aerodynamic downforces are detectable via at least one load sensor without excessive signal noise.

With continuing reference to process block 103 of FIG. 2, the average downforce value calculation may include storing, e.g., in memory device 28 of FIG. 1, and contemporaneously analyzing, e.g., via vehicle controller 30, only a calibrated subset of the downforce signals received over a calibrated time window to calculate the average downforce value. Once the subset of sensor signal values has been established, the vehicle controller may execute stored instructions to isolate a calibrated number of sensor signal value outliers in the stored subset, and cull out these outliers from the stored subset prior to calculating the average downforce value. Any of the vehicle "calibrated" values discussed herein may be developed for a specific vehicle platform—often specified by vehicle make, model, year, body, trim, etc.—employing on-vehicle testing on test roads, on-vehicle testing in a wind tunnel, and physics-based analytical techniques. The number of outliers removed from the analyzed subset could depend on the number of sensor reading samples in the subset (e.g., 100-sample subset, 3 outliers; 200-sample subset, 5 outliers, etc.). After removing these outliers from the stored sensor signal values, the average downforce value is calculated from the abridged subset.

The method 100 of FIG. 2 continues to decision block 105 to determine if the average downforce value calculated at process block 103 differs from a predicted, modeled, or otherwise calibrated downforce value corresponding to the vehicle operating state during which the calibrated subset was built over the calibrated time window. For at least some applications, block 103 further determines if the average downforce value differs from the predicted downforce value by a hard-coded threshold drift error percentage or other predetermined maximum tolerance that is calibrated to the steady-state condition in which the motor vehicle is operating for a particular sensor calibration. By way of example, vehicle controller 30 of FIG. 1 may receive, look up, or access (collectively "retrieve") the predicted downforce value from mapped vehicle downforce data that is stored in memory device 28. This mapped data may be embodied as a series of aerodynamic characteristic maps, each of which corresponds to a respective vehicle operating state and includes expected downforce values correlated to respective vehicle speeds when the motor vehicle is operating under the respective vehicle operating condition. The subject vehicle may be evaluated in a wind tunnel to experimentally derive each aerodynamic characteristic map. The wind tunnel simulates the movement of air around the vehicle under controlled wind speeds, temperatures, and other conditions to determine magnitudes of forces acting upon the vehicle with the vehicle controlled under various operating parameters. Such operating parameters may include front and rear vehicle ride height, pitch, roll, heading angle, air velocity, vehicle velocity, and position(s) of one or more aerodynamic devices, such as front air dams, rear spoilers, etc.

One representative manner of generating the aforementioned mapped vehicle downforce data includes sweeping the vehicle through a standardized "full" range of vehicle ride heights and vehicle pitch angles in a wind tunnel at a progression of wind speeds. The resultant data may be composed of a minimum of four maps per test point, where each map consists of the lift coefficients at a full range of ride heights and pitch angles with the active aero element(s) held static in a single operating position. In some specific cases, there are approximately 10-15 test points, each with full maps of lift coefficients at various ride heights. A vehicle controller may then determine a predicted level of downforce the vehicle should be experiencing at a specific steady-state condition by first looking at the respective positions of the active aero elements. In so doing, only two to four of the data maps need be utilized (e.g., depending on method used), namely those that are deemed "closest" to the absolute points recorded. The algorithm subsequently compares the coefficients of lift in the maps closest to the element position feedback at the ride heights the car is reporting and interpolates between them to identify a calibrated value. If a vehicle is sitting idle on a flat surface, it may be assumed that there is no active aero deployment and, commensurately, no measurable aerodynamic downforces. In this case, if a load sensor is transmitting reading values that are higher or lower than a set zero value or calibrated datum value relative to the data maps, the system records the difference or percent difference to establish proof of a potential drift error.

In at least some applications, each load sensor is placed at or proximal the source of downforce. Even with this placement, a load sensor may still be susceptible to irrepressible sensor "noise," such as inertial load transfers, large crosswinds, significant temperature differentials, wind angle, road traffic, etc., which may result in a disproportional downforce reading. The sensor system may partially compensate for any such noise by scaling sensor signals to a proportional gain. Sensor noise is more drastically mitigated by testing and calibrating vehicle load sensors while the vehicle is operating in steady-state conditions. For instance, when a vehicle yaws or crests or banks sharply, the angle of airflow experiences sharp rises and valleys; this dramatic fluctuation can negatively affect sensor readings. It may therefore be desirable to sample the disparity between load-sensor generated data and map borne data when the vehicle is traveling straight on level road at controlled speeds.

If a negative determination is returned from block 105, i.e., with an indication that the average downforce value does not drastically differ from the hard-coded downforce value (Block 107=NO), the vehicle controller will continue to dynamically control operation of the vehicle's active aerodynamics device(s) based, at least in part, on subsequent downforce signals received from the load sensor(s) without applying an offset value to these readings, at block 109. Conversely, if a positive determination is returned from block 105, i.e., indicating that the calculated average downforce value does differ from the predicted downforce value by more than a hard-coded threshold drift error percentage (Block 111=YES), the sensor system will self-calibrate the load sensors at block 113 by applying an offset value to subsequent downforce signals received from each load sensor classified as drifting. Once calibrated, the vehicle controller will dynamically control operation of the vehicle's active aero device(s) based, in whole or in part, on subsequent downforce signals as modified by the applied offset value. Prior to applying the offset, the vehicle controller may first wish to determine whether the vehicle is in a static state, a quasi-static state, or a key-up state; the offset value is only applied in response to a determination that the motor vehicle is in a static, quasi-static or key-up state. Timing of offset application may be dependent on error magnitude, as one example.

If a drifting sensor is flagged, the method 100 of FIG. 2 may further comprise executable instructions for a vehicle controller to determine if a calculated average downforce value for one of the drifting load sensor exceeds a hard-coded maximum drift value (e.g., stored in the vehicle's resident memory device). If it is determined that the average downforce value does in fact exceed this maximum drift value, which likely indicates that the fault cannot be sufficiently rectified through the application of an offset, the vehicle controller responsively outputs an audible or visible sensor fault warning to the driver or other user, e.g., through cooperative operation with a center-stack telematics unit or driver-side instrument cluster. Put another way, once a sensor reading disparity is identified, the system assess whether it is a "small-percentage" disparity, such that adjusting the sensor's output with an offset value will rectify the disparity without causing a significant change in the vehicle's aerodynamic performance and balance. Likewise, if multiple load sensors suggest a similar disparity, they can all be simultaneously adjusted with the same offset value without affecting overall vehicle balance and aero performance. In the second case, however, a reading disparity that is adjudged to be a "large-percentage" disparity is likely caused by a damaged or malfunctioning sensing device. In this case, an electronic warning is sent to the driver or manufacturer or dealership suggesting that the sensor be manually inspected to confirm or refute that there is something wrong.

Utilizing stored data from specific driving situations where vehicle state can be accurately modeled and/or stored data of the vehicle sitting idle or substantially idle on a generally flat surface, disclosed closed-loop sensor systems are operable to determine if a load sensor has drifted and responsively "self-calibrate" the sensor to correct for said drift. For instance, if it is determined that an active aero downforce sensor has drifted, and it is determined that vehicle steady-state conditions are adequately met, an offset is applied to the drifted sensor. This helps to enable an active aero control system to use a self-learning, load-sensing strategy that eliminates the need to regularly or intermittently recalibrate onboard vehicle sensors. Disclosed calibration methods help to eliminate the cost of dedicated plant improvements to reduce trim-height variation, and help to eliminate recurring costs associated with plant-learn calibration and dealer recalibration. Additionally, using self-calibrating load sensors helps to increase the accuracy of downforce estimates and, thus, improve vehicle "awareness." Improved knowledge of actual downforce, in turn, helps to improve the accuracy of the commanded active aero downforce, thereby further optimizing vehicle performance and handling.

Aspects of this disclosure may be implemented, in some embodiments, through a computer-executable program of instructions, such as program modules, generally referred to as software applications or application programs executed by an on-board vehicle computer. The software may include, in non-limiting examples, routines, programs, objects, components, and data structures that perform particular tasks or implement particular abstract data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore, be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, or method disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in other manners (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A sensor system for controlling an active aerodynamics device of a motor vehicle, the motor vehicle including a vehicle body, the active aerodynamics device being mounted to the vehicle body, the sensor system comprising:
   a load sensor configured to mount to the vehicle body, the load sensor being operable to detect a downforce on the motor vehicle and generate signals indicative thereof;
   a memory device storing mapped vehicle downforce data calibrated to the motor vehicle; and
   a vehicle controller communicatively connected to the load sensor, the memory device, and the active aerodynamics device, the vehicle controller being programmed to:
   receive downforce signals from the load sensor;
   calculate an average downforce value from the received downforce signals;
   determine if the calculated average downforce value differs from a calibrated downforce value retrieved from the mapped vehicle downforce data stored in the memory device;
   responsive to a determination that the calculated average downforce value differs from the calibrated downforce value, apply an offset value to modify subsequent downforce signals received from the load sensor; and dynamically control operation of the active aerodynamics device based, at least in part, on the subsequent downforce signals modified by the offset value.

2. The sensor system of claim 1, wherein the calculating includes the vehicle controller storing in the memory device only a calibrated subset of the downforce signals received over a calibrated time window, and wherein the received downforce signals used to calculate the average downforce value are limited to the stored calibrated subset of the downforce signals.

3. The sensor system of claim 2, wherein the calculating further includes the vehicle controller identifying a calibrated number of outliers in the stored subset, and eliminating the identified outliers from the stored subset prior to calculating the average downforce value.

4. The sensor system of claim 2, wherein the vehicle controller is further programmed to determine if the motor vehicle is operating in any one of a plurality of calibrated steady-state conditions, and wherein the calculating is initiated in response to a determination that the motor vehicle is operating in any one of the calibrated steady-state conditions.

5. The sensor system of claim 4, wherein the plurality of calibrated steady-state conditions includes: a designated quasi-static vehicle state, in which the motor vehicle is idle or substantially idle on a flat or substantially flat surface and downforce is detectable via the load sensor; and a designated dynamic vehicle state, in which the motor vehicle is moving across a flat or substantially flat surface and downforce is detectable via the load sensor without excessive signal noise.

6. The sensor system of claim 1, wherein the determining if the calculated average downforce value differs from the calibrated downforce value includes determining if the calculated average downforce value differs from the calibrated downforce value by a hard-coded threshold drift error percentage.

7. The sensor system of claim 1, wherein the vehicle controller is further programmed to, responsive to a determination that the average downforce value does not differ from the calibrated downforce value, dynamically control operation of the active aerodynamics device based, at least in part, on subsequent downforce signals unmodified by the offset value.

8. The sensor system of claim 1, wherein the vehicle controller is further programmed to:

determine if the calculated average downforce value exceeds a hard-coded maximum drift value differential stored in the memory device; and responsive to a determination that the average downforce value exceeds the hard-coded maximum drift value differential, output a sensor fault warning to a user of the vehicle indicating service of the load sensor is needed.

9. The sensor system of claim 1, wherein the vehicle controller is further programmed to determine if the motor vehicle is in any of a static state, a quasi-static state and a key-up state, and wherein applying the offset value is responsive to a determination that the motor vehicle is in one of the static, quasi-static or key-up states.

10. The sensor system of claim 1, wherein the mapped vehicle downforce data includes a series of aerodynamic characteristic maps, each of the aerodynamic characteristic maps corresponding to a respective vehicle operating state and including a plurality of expected downforce values each correlated to a respective one of a plurality of vehicle speeds when the motor vehicle is operating under the respective vehicle operating state.

11. The sensor system of claim 1, wherein the vehicle controller is resident to or remote from the vehicle body of the motor vehicle.

12. The sensor system of claim 1, wherein the memory device is integral with the vehicle controller, configured to mount to the vehicle body, or remote from the motor vehicle.

13. A motor vehicle comprising:

a vehicle body with a passenger compartment and multiple road wheels;

an active aerodynamics device mounted to the vehicle body and selectively movable to modify an aerodynamic characteristic of the motor vehicle;

a load sensor mounted to the vehicle body, the load sensor being operable to detect a downforce on the motor vehicle and generate signals indicative thereof;

a memory device storing mapped vehicle downforce data calibrated to the motor vehicle; and a vehicle controller communicatively connected to the load sensor, the memory device, and the active aerodynamics device, the vehicle controller being programmed to:

receive downforce signals from the load sensor;

calculate an average downforce value from the received downforce signals;

determine if the calculated average downforce value differs from a calibrated downforce value retrieved from the mapped vehicle downforce data;

responsive to a determination that the calculated average downforce value differs from the calibrated downforce value, apply an offset value to modify subsequent downforce signals received from the load sensor; and dynamically control operation of the active aerodynamics device based, at least in part, on the subsequent downforce signals modified by the offset value.

14. A method of calibrating a sensor system for controlling an active aerodynamics device of a motor vehicle, the motor vehicle including a vehicle body, the active aerodynamics device being mounted to the vehicle body, the method comprising:

detecting, via a load sensor mounted to the vehicle body, a downforce on the motor vehicle;

receiving, from the load sensor via a vehicle controller communicatively connected thereto, downforce signals indicative of the detected downforce;

calculating, via the vehicle controller, an average downforce value from the received downforce signals;

retrieving, from a memory device via the vehicle controller communicatively connected thereto, a calibrated downforce value stored in mapped vehicle downforce data calibrated to the motor vehicle;

determining, via the vehicle controller, if the calculated average downforce value differs from the calibrated downforce value retrieved from the mapped vehicle downforce data stored in the memory device;

responsive to a determination that the calculated average downforce value differs from the calibrated downforce value, applying an offset value to modify subsequent downforce signals received from the load sensor; and dynamically controlling operation of the active aerodynamics device based, at least in part, on the subsequent downforce signals modified by the offset value.

15. The method of claim 14, wherein the calculating includes storing in the memory device only a calibrated subset of the downforce signals received over a calibrated time window, and wherein the received downforce signals used to calculate the average downforce value are limited to the stored calibrated subset of the downforce signals.

16. The method of claim 15, wherein the calculating further includes identifying a calibrated number of outliers in the stored subset, and eliminating the identified outliers from the stored subset prior to calculating the average downforce value.

17. The method of claim 15, further comprising determining if the motor vehicle is operating in any one of a plurality of calibrated steady-state conditions, and wherein the calculating the average downforce value is initiated in response to a determination that the motor vehicle is operating in any one of the calibrated steady-state conditions.

18. The method of claim 14, further comprising, responsive to a determination that the average downforce value does not differ from the calibrated downforce value, dynamically controlling operation of the active aerodynamics device based, at least in part, on subsequent downforce signals unmodified by the offset value.

19. The method of claim 14, further comprising:
determining, via the vehicle controller, if the calculated average downforce value exceeds a hard-coded maximum drift value differential stored in the memory device; and
responsive to a determination that the average downforce value exceeds the hard-coded maximum drift value differential, transmitting a sensor fault signal warning to a user of the vehicle indicating service of the load sensor is needed.

20. The method of claim 14, further comprising determining, via the vehicle controller, if the motor vehicle is in any of a static state, a quasi-static state and a key-up state, and wherein applying the offset value is responsive to a determination that the motor vehicle is in one of the static, quasi-static or key-up states.

* * * * *